(No Model.) 2 Sheets—Sheet 2.
A. W. BARTHOLOMEW.
DIE STOCK.
No. 395,686. Patented Jan. 8, 1889.
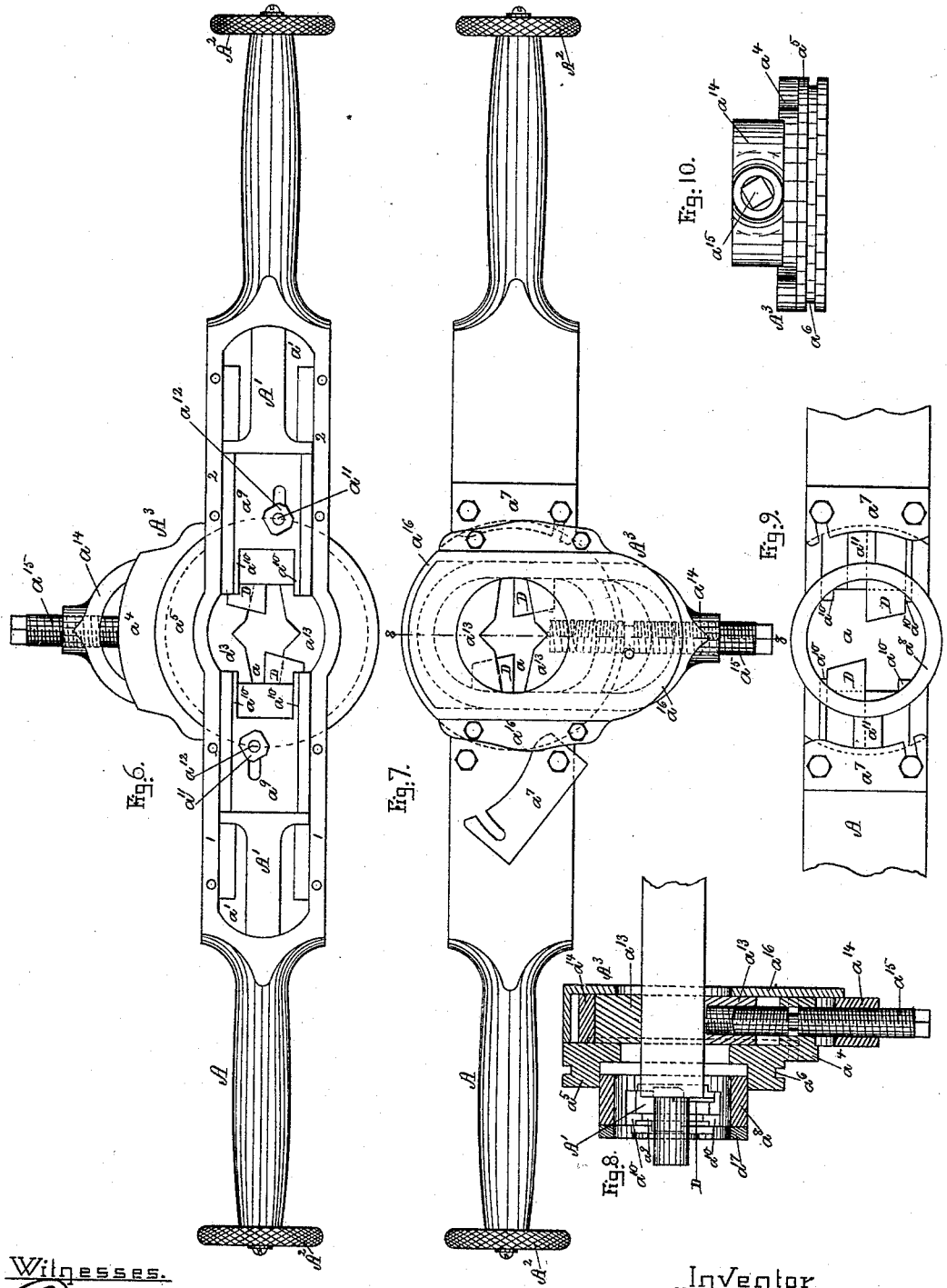
Witnesses.
Edward F. Beach
John R. Snow
Inventor
Albert W. Bartholomew,
by his attorney,
J. E. Maynadier

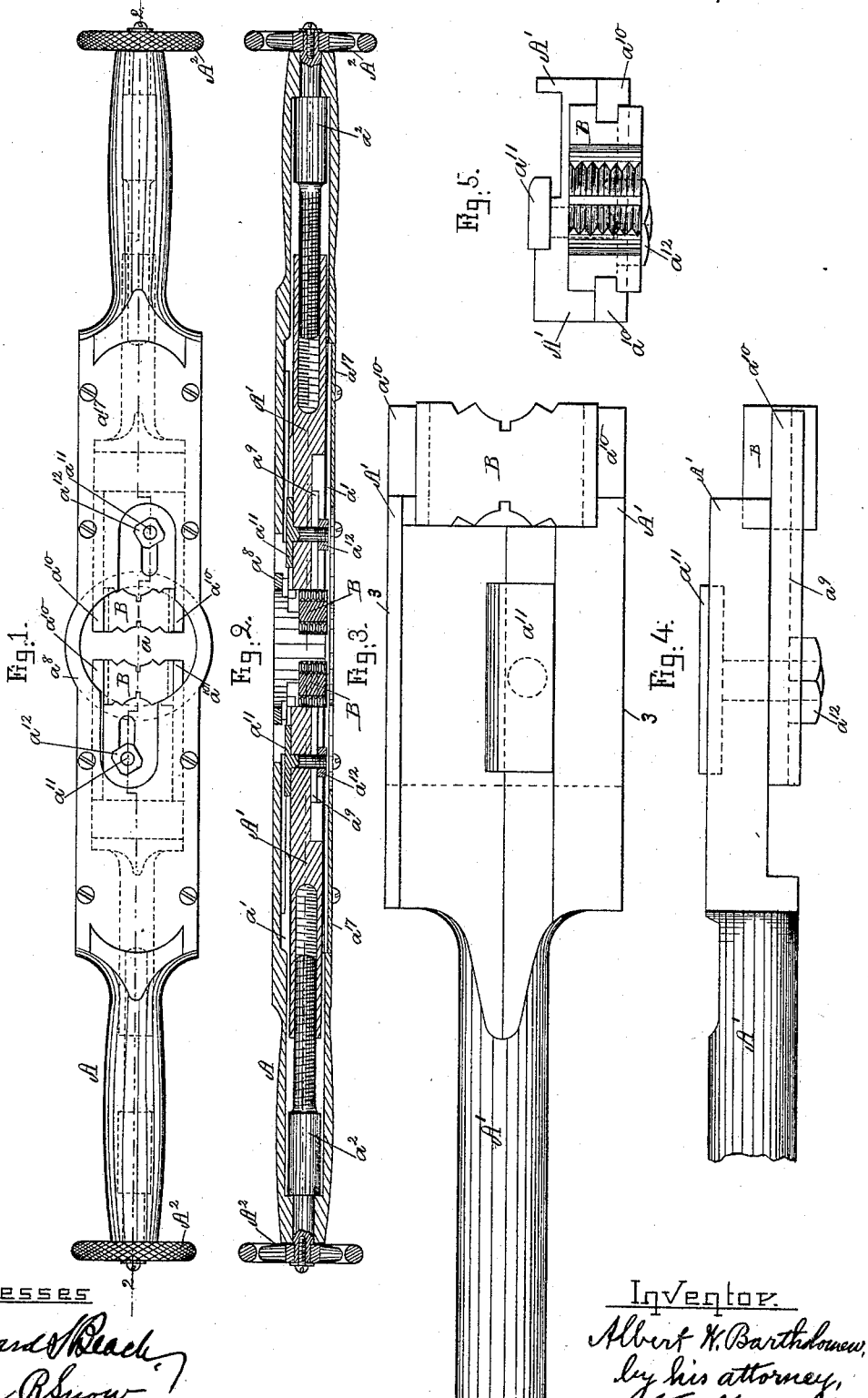

UNITED STATES PATENT OFFICE.

ALBERT W. BARTHOLOMEW, OF BOSTON, MASSACHUSETTS, ASSIGNOR OF ONE-THIRD TO THOMAS C. ASHLEY, OF SAME PLACE.

DIE-STOCK.

SPECIFICATION forming part of Letters Patent No. 395,686, dated January 8, 1889.

Application filed March 23, 1888. Serial No. 268,264. (No model.)

*To all whom it may concern:*

Be it known that I, ALBERT W. BARTHOLOMEW, of Boston, in the county of Suffolk and State of Massachusetts, have invented a new and useful Improvement in Cutting-Off and Thread-Cutting Devices, of which the following is a specification, reference being had to the accompanying drawings, in which—

Figure 1 is a plan of my device with the chuck removed. Fig. 2 is a section on line 2 2 of Fig. 1. Fig. 3 is a plan, Fig. 4 an edge view, and Fig. 5 an end view, of a detached carrier, full size, provided with an ordinary threaded cutting-die. Fig. 6 is a plan of my device provided with a chuck. Fig. 7 is an obverse plan of what is shown in Fig. 6. Fig. 8 is a section on line 8 8 of Fig. 7. Fig. 9 is a plan of a portion of the stock of my device, showing the cutters in the carriers and the plates which secure the stock and chuck together. Fig. 10 is an edge view of the preferred form of chuck with the cover removed.

My new tool is an improvement on that patented by my patent, No. 320,748, dated June 23, 1885; and my invention consists, first, in a device made up of a stock having a hole through it (to receive the material to be operated on) and tool-carriers mounted on opposite sides of the opening and adapted to be moved toward each other to bring the tools into contact with opposite portions of the material operated on, whereby each tool resists the pressure of the other during their operation; secondly, in the combination of a tool-carrying stock and a chuck, the stock and chuck being so connected together that the chuck may be kept stationary and the stock rotated on it; and also in certain details of construction hereinafter described and claimed.

In the drawings, A is a stock, and A' the tool-carriers, which are mounted on opposite sides of an opening, $a$, in stock A, and are adapted to be moved toward each other to bring the tools carried by them into contact with the material to be operated on. Carriers A' are preferably mounted, as shown, in a recess, $a'$, in stock A, and are moved toward and from each other by screw-rods $a^2$, which are provided with handles $A^2$. Recess $a'$ is preferably provided with a cover, as shown. By this construction I produce a device by which the work to be done is not only done much more quickly than heretofore, but is also done in a much better manner than heretofore, because each tool during its operation resists the pressure of the other tool. This is an important feature of my invention, and is of great practical importance whether the tools in the carriers be, for example, the thread-cutting dies B or the cutters D.

In order to connect the chuck and tool-carrying stock in such wise that the stock can be rotated on the chuck, support $a^4$ of the chuck is provided with a ring, $a^5$, having a groove, $a^6$, into which fit plates $a^7$, secured on stock A, ring $a^8$ on stock A fitting into ring $a^5$ and serving as a support therefor. This combination of a chuck and a tool-carrying device, which is so connected to the chuck as to be rotated thereon, is another important feature of my invention.

Portions 1 1 and 2 2 of the recess $a'$ in stock A are preferably respectively parallel to each other to receive carriers A', formed with straight parallel edges 3, so as to slide easily in the lengthwise recess $a'$. This is a minor feature of my invention.

Another feature of my invention lies in the combination of the carriers with a forked plate, $a^9$, between the arms $a^{10}$ of which the dies B are received. By this construction I am enabled to use dies of the standard size, the arms $a^{10}$ fitting in the grooves in the edges of the dies. The plates $a^9$ are clamped to the carriers by clamps $a^{11}$ $a^{12}$, by means of which cutters D are also clamped in place, an edge of each clamp $a^{11}$ overlapping each cutter and clamping the cutter firmly to its carrier A', as shown in Fig. 9, and as will be plainly understood by reference to Fig. 5, in which a cutter, however, is not shown.

The best form of chuck known to me for use in combination with tool-carrying stock A is the chuck illustrated in the drawings, wherein jaws $a^{13}$ of the chuck are shown mounted in frame $a^{14}$, one jaw being secured at one end of the frame, and the other jaw being carried by a screw, $a^{15}$, through the frame $a^{14}$. Screw $a^{15}$ is a right and left hand screw and passes through the support $a^4$, in which the screw is journaled, to carry one of the jaws $a^{13}$ toward the jaw on the screw, and at the same time the jaw carried by the screw is moved toward the other jaw. Support $a^4$ preferably forms part of the chuck-case, as shown.

The operation of my device is as follows: When it is to be used for cutting a thread, the jaws of the chuck are moved out of the way, or the chuck is removed by unclamping the plates $a^7$ and swinging them out to release the chuck. Thread-cutting dies are inserted and the plates $a^9$ properly adjusted. Stock A is then rotated on the material operated on, the dies B being kept in proper contact with the material by turning the screws $A^2$. When the thread is cut, dies B are moved away from each other and the material released. When the device is to be used as a cutting-off device, dies B are removed and cutters D clamped on the carriers. The jaws of the chuck are clamped on the material to be operated on, and, owing to the construction and arrangement of the chuck, as above described, the material is very nicely centered for the operation of the cutters D, which are driven inwardly toward each other by sliding the carriers, as explained. The clamping of the device on the material prevents the cutters from moving sidewise and making false cuts.

I am aware of Saunders's patent, No. 317,022, dated May 5, 1885, and Burin's patent, No. 225,048, dated March 2, 1880, and disclaim all that is shown in them, devices embodying my invention differing radically from Saunders's device, in that the tool-carriers in my device are connected directly to screw-rods, by the rotation of which in one direction the tool-carriers are moved inwardly, being moved outwardly by rotating the screw-rod in the opposite direction. The tool-carriers in Saunders's patent are moved inwardly by screws, which push against them, and they are then clamped in position by a set-screw. To move the tool-carrier in the opposite direction it is necessary to loosen the set-screw, turn back the first-mentioned screw, and then slide the tool-carrier back by the fingers.

Devices embodying my invention differ radically from the device shown in Burin's patent, in that that portion of my device which carries the knives is of a length many times the diameter of the chuck which co-operates with the knives and the part carrying the knives, and the consequence is that when the pipe to be cut off is secured in my chuck the part carrying the knives and rotating on the chuck can be spun around by hand, the weight and the length of the arms of the stock carrying the knives adding greatly to the practical efficiency and convenience of my device. In Burin's patent, on the contrary, the head carrying the knives is rotated either by a crank and gears or by handspikes, and it is apparent from this patent that the idea of providing the tool-carrying portion of the device with integral handles or arms the weight and length of which are made use of in cutting off the pipe is not suggested by Burin. This is a radical difference between the two devices.

What I claim is—

1. Stock A, having an opening, $a$, in combination with the tool-carriers $A'$, mounted in stock A on opposite sides of the opening $a$, and screw-rods $a^2$, mounted in stock A and secured to tool-carriers $A'$ to move the tool-carriers toward and away from the opening $a$ in the stock, substantially as and for the purpose set forth.

2. Stock A, having an opening, $a$, intermediate the ends of the stock, tool-carriers $A'$, mounted in the stock A, one on each side of the opening $a$, and means, substantially such as described, for moving the carriers toward and away from the opening $a$, in combination with a chuck, $A^3$, stock A and chuck $A^3$ being connected together, so that one can be rotated on the other, the opening $a$ in stock A being located in relation to the jaws of the chuck, substantially as shown, and stock A being extended into handles, substantially as and for the purpose set forth.

3. In a device substantially such as described, stock A, having an opening, $a$, and a recess, $a'$, portions of the side walls of which are parallel, in combination with carrier $A'$, having parallel edges 3 and mounted in the recess $a'$, and screw-rods $a^2$, connected to carriers $A'$ and mounted in the stock A, the carriers being on opposite sides of the opening $a$ in stock A, all substantially as and for the purpose set forth.

4. In a device, substantially such as described, carrier $A'$, in combination with forked plate $a^9$, having arms $a^{10}$, substantially as and for the purpose set forth.

ALBERT W. BARTHOLOMEW.

Witnesses:
EDWARD S. BEACH,
JOHN R. SNOW.